US010826779B2

(12) United States Patent
Perotin

(10) Patent No.: US 10,826,779 B2
(45) Date of Patent: Nov. 3, 2020

(54) METHOD FOR MANAGING A NETWORK OF COMPUTE NODES

(71) Applicant: BULL SAS, Les Clayes-sous-Bois (FR)

(72) Inventor: Matthieu Perotin, Grenoble (FR)

(73) Assignee: BULL SAS, Les Clayes-Sous-Bois (FR)

( * ) Notice: Subject to any disclaimer, the term of this patent is extended or adjusted under 35 U.S.C. 154(b) by 207 days.

(21) Appl. No.: 15/534,816

(22) PCT Filed: Dec. 8, 2015

(86) PCT No.: PCT/FR2015/053368
§ 371 (c)(1),
(2) Date: Jul. 27, 2017

(87) PCT Pub. No.: WO2016/092197
PCT Pub. Date: Jun. 16, 2016

(65) Prior Publication Data
US 2017/0353358 A1    Dec. 7, 2017

(30) Foreign Application Priority Data

Dec. 10, 2014    (FR) .................................. 14 62157

(51) Int. Cl.
*G06F 15/16*    (2006.01)
*H04L 12/24*    (2006.01)
(Continued)

(52) U.S. Cl.
CPC ............ *H04L 41/12* (2013.01); *G06F 9/5083* (2013.01); *G06F 15/16* (2013.01); *G06F 15/161* (2013.01);
(Continued)

(58) Field of Classification Search
USPC ........................................................ 709/223
See application file for complete search history.

(56) References Cited

U.S. PATENT DOCUMENTS 5,651,006 A * 7/1997 Fujino ................. H04L 41/0213
370/408
6,414,955 B1 * 7/2002 Clare ...................... H04L 41/12
370/390
(Continued)

FOREIGN PATENT DOCUMENTS

WO    WO 2005/106668 A1    11/2005

OTHER PUBLICATIONS

International Search Report as issued in International Patent Application No. PCT/FR2015/053368, dated Mar. 3, 2016.
(Continued)

*Primary Examiner* — Anthony Mejia
(74) *Attorney, Agent, or Firm* — Pillsbury Winthrop Shaw Pittman LLP

(57) ABSTRACT

A method of managing a network of calculation nodes interconnected by a plurality of interconnection devices, includes organizing the calculation nodes into groups of calculation nodes, for each group of calculation nodes, connecting the interconnection devices interconnecting the nodes of the group to a group management node, the management node being dedicated to the group of calculation nodes on each management node execution of an administration function by the implementation of independent management modules, each management module of a management node being able to communicate with the other management modules of the same management node.

17 Claims, 2 Drawing Sheets

(51) Int. Cl.
  *G06F 15/173* (2006.01)
  *G06F 9/50* (2006.01)
  *H04L 29/08* (2006.01)

(52) U.S. Cl.
  CPC ........ *G06F 15/17362* (2013.01); *H04L 67/10* (2013.01)

(56) References Cited

U.S. PATENT DOCUMENTS

| | | | | |
|---|---|---|---|---|
| 6,694,304 | B1* | 2/2004 | Sethi | H04L 41/0213 |
| 7,167,476 | B1* | 1/2007 | Kritayakirana | H04J 3/1617 |
| | | | | 370/394 |
| 7,873,719 | B2* | 1/2011 | Bishop | H04L 43/0811 |
| | | | | 709/223 |
| 8,040,811 | B2* | 10/2011 | Edwards | H04L 41/22 |
| | | | | 370/241 |
| 8,488,577 | B1* | 7/2013 | MacPherson | H04L 12/5692 |
| | | | | 370/338 |
| 8,738,745 | B1* | 5/2014 | Brandwine | H04L 41/12 |
| | | | | 709/220 |
| 9,923,975 | B2* | 3/2018 | Galchev | G06F 9/5027 |
| 2004/0068479 | A1* | 4/2004 | Wolfson | G06F 16/273 |
| 2004/0078495 | A1* | 4/2004 | Mousseau | G06F 9/44 |
| | | | | 710/1 |
| 2005/0086336 | A1* | 4/2005 | Haber | H04L 1/243 |
| | | | | 709/223 |
| 2006/0072572 | A1* | 4/2006 | Ikeda | H04L 12/18 |
| | | | | 370/390 |
| 2007/0226225 | A1* | 9/2007 | Yiu | H04L 12/1818 |
| 2007/0250625 | A1* | 10/2007 | Titus | H04L 69/28 |
| | | | | 709/224 |
| 2008/0170589 | A1* | 7/2008 | Yim | H04L 67/06 |
| | | | | 370/468 |
| 2010/0050181 | A1* | 2/2010 | Zhang | H04L 67/10 |
| | | | | 718/104 |
| 2010/0120011 | A1* | 5/2010 | O'Brien | G06Q 10/10 |
| | | | | 434/362 |
| 2010/0246443 | A1* | 9/2010 | Cohn | H04L 41/12 |
| | | | | 370/255 |
| 2011/0231536 | A1* | 9/2011 | Tanaka | H04L 67/1046 |
| | | | | 709/223 |
| 2014/0052836 | A1* | 2/2014 | Nguyen | H04L 45/38 |
| | | | | 709/223 |
| 2014/0149485 | A1* | 5/2014 | Sharma | H04L 67/142 |
| | | | | 709/202 |
| 2014/0237100 | A1* | 8/2014 | Cohn | H04L 41/50 |
| | | | | 709/223 |
| 2014/0362700 | A1* | 12/2014 | Zhang | H04W 24/02 |
| | | | | 370/235 |
| 2015/0043378 | A1* | 2/2015 | Bardgett | H04L 12/4641 |
| | | | | 370/254 |
| 2015/0227318 | A1* | 8/2015 | Banka | G06F 3/0688 |
| | | | | 709/202 |
| 2015/0261633 | A1* | 9/2015 | Usgaonkar | G06F 11/2097 |
| | | | | 714/6.3 |
| 2016/0380813 | A1* | 12/2016 | Wass | H04L 67/125 |
| | | | | 709/220 |

OTHER PUBLICATIONS

Hussain, H., et al., "A survey on resource allocation in high performance distributed computing systems," Parallel Computing 39 (2013), pp. 709-736.

* cited by examiner

METHOD FOR MANAGING A NETWORK OF COMPUTE NODES

CROSS-REFERENCE TO RELATED APPLICATIONS

This application is the U.S. National Stage of PCT/FR2015/053368, filed Dec. 8, 2015, which in turn claims priority to French Patent Application No. 1462157 filed Dec. 10, 2014, the entire contents of all applications are incorporated herein by reference in their entireties.

TECHNICAL FIELD OF THE INVENTION

The invention relates to a method for managing a network of compute nodes.

A network of compute nodes is understood to mean, in the context of the present invention, any network of machines, where a machine is at least one of: a computer, a server, a blade server, etc. It relates in particular to clusters of servers, i.e. supercomputers, or alternatively high-performance computers. It also relates to the field of high-performance computation, referred to as HPC.

STATE OF THE PRIOR ART

Current supercomputers have a computation power of the order of one petaflop ($10^{15}$ floating-point operations per second (flops)). This level of performance is attained by causing 5000 to 6000 computers/servers interconnected using specific topologies to operate simultaneously. These interconnections are made by using switches and wires. In the case of a supercomputer, to designate a computer/server, the term "compute node" is used, or simply "node".

The networks used in this high-performance computation field are very specialised, and require suitable management. Typically, these services, known as "Fabric Management" or "Fabric Manager", must provide routing functions, in order to make the communications possible, but also for acquisition and processing of production data (feedback of errors and operating counters).

The switches, and therefore the network, are administered by a management node connected to the network. The management node manages the compute nodes and switches via the same physical network. The switch management protocol depends on the nature of the switches. In practice, in a supercomputer, InfiniBand switches are used; the protocol used is therefore defined by the InfiniBand specification.

The management node, implementing a management function, enables the switches to be configured and supervised. The number of failures grows with the number of switches, and therefore becomes high. Requirements for analysis of the properties of the supercomputer are also substantial. This implies that there are many maintenance communications over the network. A maintenance communication is a use of resources which is not related to the computations required from the supercomputer. In the case in hand this relates, for example, to an alert message transmitted by a switch one of the ports of which is defective, or a collection message transmitted by a management node to obtain statistics relating to a switch.

The increase of the power of supercomputers implies an increase of the number of nodes, and therefore an increase of the number of interconnections, and therefore also an increase of the number of network maintenance messages between the switches and the management node.

This has two negative consequences:

The management node responsible for processing the messages transmitted by the equipment is no longer able to process all the messages, due to a lack of computation power or network capacity, This inability to process, or this delay in processing, causes a delay for decisions impacting the high-performance network: congestion may occur and be become a permanent feature, penalising applications or even paralysing the supercomputer.

The collapse phenomenon is recognised in supercomputers with 8000 nodes and with some thousand switches. Such a supercomputer does not attain exaflops ($10^{18}$ flops), which is however the current goal of research into supercomputers.

The existing solutions are currently centralised. One example is the pair {OpenSM, IBMS}, which is the solution proposed by certain supercomputer manufacturers in order to manage InfiniBand (IB) type networks.

OpenSM, which is responsible for acquiring the topologies and for routing, is starting to cause substantial latency in the calculation of the routes, and IBMS, which centralises the errors in a single database, results in a high CPU load.

Furthermore, there are few error correlation possibilities, which is particularly regrettable since this function becomes invaluable at these scales.

Finally, operating data (error and performance counters) can be managed only laboriously, since individual requests, which are made from a single central point, must be transmitted and then assembled.

DESCRIPTION OF THE INVENTION

The invention seeks to remedy all or a proportion of the disadvantages of the state of the art identified above, and in particular to propose means to enable the increased complexity of supercomputers to be addressed.

With this aim, the present invention proposes fine modelling of these roles and an implementation which is divided into individual although interconnected and distributable modules. Each module can, in turn, be distributed according to a hierarchical arrangement of the supercomputer, which enables the invention to operate up to the sizes of supercomputers which are the subject of active research, i.e. exaflopic supercomputers, and even more powerful ones.

To this end, one aspect of the invention relates to a method for managing a network of compute nodes interconnected by a plurality of interconnection devices characterised by the fact that it includes the following steps:

Organisation of compute nodes into groups of compute nodes,

For each group of compute nodes, connection of interconnection devices interconnecting the nodes of the group to a group management node, where the said management node is dedicated to the group of compute nodes In each management node, execution of a management function through the implementation of independent management modules, where each module for managing a management node is able to communicate with the other management modules of the same management node.

In addition to the main characteristics described in the preceding paragraph, the method/device according to the invention may have one or more of the following possible additional characteristics, considered individually or in technically possible combinations:

a group management node is connected in an out-of-band mode to interconnection devices;

communications between management modules of a given management node are accomplished asynchronously;

the management modules are chosen from the group formed from at least:
A network topology management module,
A routing management module,
A network supervision module,
A network performance measurement module, at least one management node is connected to a level-2 management node;

the communications between the at least one management node and the level-2 management node are accomplished in an out-of-band mode;

a management node module processes messages received from at least one interconnection device to reduce the quantity of data transmitted to the level-2 management node.

Another object of the invention is a digital storage device including a file with instruction codes implementing the method according to one of the previous claims.

Another object of the invention is a device implementing a method according to a combination of the above characteristics

BRIEF DESCRIPTION OF THE FIGURES

Other characteristics and advantages of the invention will be seen clearly on reading the description below, with reference to the appended figures, which illustrate.

For greater clarity, identical or similar elements are identified by identical reference signs in all the figures.

The invention will be better understood on reading the description which follows, and on examining the figures accompanying it. These are shown as an indication only, and are not restrictive of the invention in any manner.

DETAILED DESCRIPTION OF ONE IMPLEMENTATION

Figure 1:
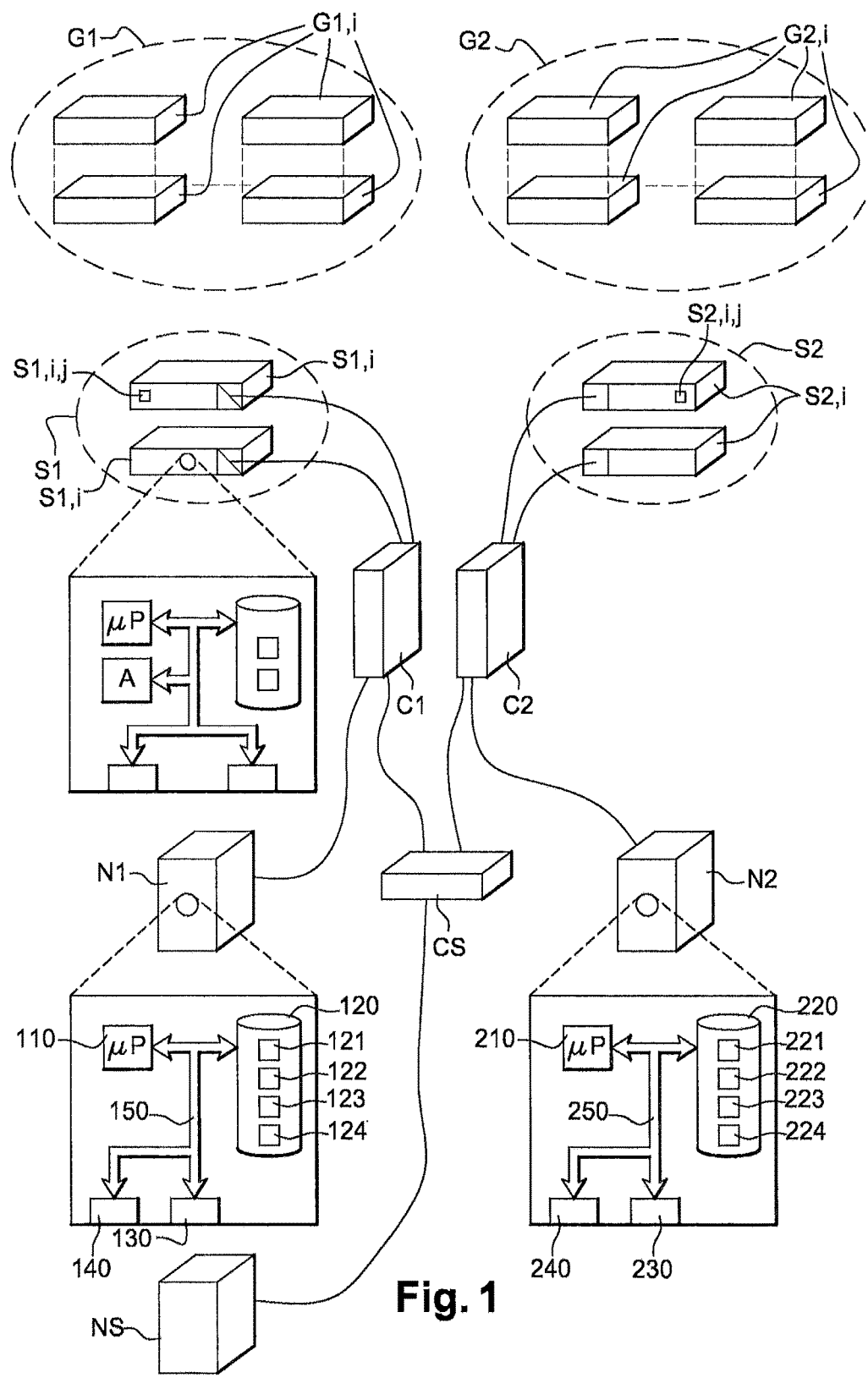
FIG. 1, a view of a portion of a supercomputer according to the invention.

FIG. 1 shows in a simplified manner an implementation of the invention. FIG. 1 shows a first group G1 of compute nodes G1.$i$, where each node G1.$i$ of first node group G1 is connected to at least one port S1.$i.j$ of a switch S1.$i$ of a first group S1 of switches.

In practice all the compute nodes of the first group of compute nodes are connected to ports of the same kind. These are InfiniBand ports, or equivalent. Each switch in first group S1 of switches is itself connected to at least one other switch in first group S1 of switches. This enables all the compute nodes of first group G1 of compute nodes to be connected to one another, and a network to be established between them by this means. The various physical connections and the corresponding wires are not shown, in order not to overcomplicate the figures.

FIG. 1 shows that each switch in the first group of switches has an identical structure. Each switch in the first group of switches includes, schematically:
a general processing microprocessor,
a specialised circuit or ASIC for switch processing,
a storage memory with several areas, including at least:
a first network area containing instruction codes to provide switching and management of the switch,
a second area containing a routing table;
a plurality of processing connectors, or ports, according to a first format, habitually the InfiniBand format,
a management connector, or port, according to a second format, habitually the Ethernet format; this port is therefore an out-of-band port relative to the plurality of infiniband connectors;
a bus to interconnect the various above-mentioned elements of the switch, The connectors, or ports, are physical communication interfaces or network interfaces.

When an action is imparted to a device it is in fact performed by a microprocessor of the device controlled by instruction codes recorded in a memory of the device. If an action is imparted to an application it is in fact performed by a microprocessor of the device in a memory where the instruction codes for the application are recorded. From a functional standpoint, for the comprehension of this paragraph, no distinction is made between a microprocessor, a microcontroller and an arithmetical and logic unit.

FIG. 1 thus shows a second group G2 of compute nodes G2.$i$, where each node G2.$i$ of second group G2 of nodes is connected to at least one port S2.$i.j$ of a switch S2.$i$ of a second group S2 of switches.

The second group of compute nodes and the second group of switches associated with the second group of compute nodes consist of elements identical to those of the first group of compute nodes associated with the first group of switches. The switches of the second group of switches are functionally identical to the switches of the first group of switches. Organisation of these elements may vary from one group to the next, or be identical.

Those skilled in the art will easily understand that the number of groups is not limited to two, but that a description of two is sufficient to illustrate the invention.

FIG. 1 shows that the switches of the first group of switches are connected, via their management connector, to a first management switch C1. The first management switch is represented as a single device, but it could consist of a plurality of interconnected switches in order to form a network enabling all the switches of the first group of switches to be interconnected. By using the management connector an out-of-band connection can be made, i.e. the messages transmitted via the management connector do not pass over the wires connected to the plurality of connectors.

The network formed by means of the plurality of connectors is therefore dedicated to the compute nodes. In a general sense, "out-of-band" means that the signals called "out-of-band signals" are exchanged over channels or links which do not influence the performance of the channels or links used by the device to perform its main functions.

FIG. 1 shows a first management node N1 connected to the first management switch. First management node N1 includes at least, and schematically:
a microprocessor 110;
a storage memory 120 with several areas, including at least:
a routing module area 121;
a topology module area 122;
a supervision module area 123;
a network performance module area 124;
at least one first network interface 130 with a format compatible with a connector of the first management switch;
in a variant a second network interface 140;

a bus 150 to interconnect the elements of the management node.

FIG. 1 shows that the switches of the second group of switches are connected, via their management connector, to a second management switch C2. The second management switch is represented as a single device, but it could consist of a plurality of interconnected switches in order to form a network enabling all the switches of the second group of switches to be interconnected.

FIG. 1 shows a second management node N2 connected to the second management switch. Second management node N2 includes at least, and schematically, the same elements as the first management node, i.e.:
- a microprocessor 210,
- a storage memory 220 with several areas, including at least:
  - a routing module area 221;
  - a topology module area 222;
  - a supervision module area 223;
  - a network performance module area 224;
- at least one first network interface 230 with a format compatible with a connector of the first management switch;
- in a variant a second network interface 240;
- a bus 250 to interconnect the elements of the management node.

The module areas contain instruction codes, execution of which corresponds to the module's functions.

FIG. 1 shows that first management node N1 and second management node N2 are connected to a level-2 management node NS. These connections are made through a level-2 management switch CS connected to first management switch C1 and to second management switch C2.

In an out-of-band variant of the invention the first management node is:
- connected to the first management switch via its first network interface,
- connected to the level-2 management switch via its second network interface.

In this out-of-band variant the messages exchanged between the management node and the switches of a switch group do not travel on the same wires as the messages exchanged between the management node and the level-2 management node. More generally, this means that a bandwidth dedicated to the exchange of messages between the management node and a group of switches can be allocated. No other message will be able to use this bandwidth. This can be obtained by physical means, by physically separating the networks as has been illustrated, but it can also be accomplished using switches capable of managing a service quality, or QoS, contract.

Figure 2:
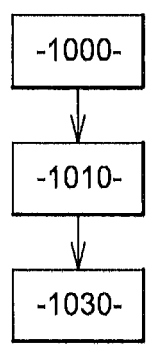
FIG. 2, a view of a step of the method according to the invention.

FIG. 2 shows a step of organisation of compute nodes into compute node groups. In this step the nodes are organised into groups, for example according to switches to which they are connected, or conversely a predetermined number of nodes is chosen and they are interconnected using switches.

A group of nodes is obtained by this means. Groups of nodes connected in this manner are also interconnected by making connections between the switches of the various groups of nodes. Grouping nodes therefore amounts to grouping switches. Every compute node connected to a switch in a group of switches, defined according to the invention, forms part of the same group of compute nodes. In other words, all nodes directly connected to a given switch form part of the same group of compute nodes. Such a group also contains a plurality of switches.

The switches in question are interconnection devices as described for FIG. 1. For a group of nodes they are connected, in a step 1010, to a management node, in an out-of-band mode. Each management node is, in turn, connected to a level-2 management node. The management nodes, all levels combined, therefore have a tree structure appropriate for the requirements of availability and scaling.

When these connections have been made the supercomputer, corresponding to all the compute nodes of the groups of compute nodes, can be started. Start-up of a supercomputer includes a step of updating the routing tables of the switches contained in the supercomputer. This update is accomplished according to an initial configuration known to the supercomputer.

When the initial settings have been written into the various elements, switches, management nodes and level-2 management node, the various management services are started in the management nodes and the level-2 management node. The various management services correspond to the previously described modules.

One feature of the invention is that these services are executed in an independent and decentralised manner. Each service corresponds to at least one process in the device which implements it. These are modules The services executed by each node include at least:
- a topology management service: this is the service which:
  - maintains up-to-date a topology database whereby, at any time, and at least, the status of each connector of each switch may be known;
- a routing service enabling the routing tables may be calculated in order to update switches;
- a supervision service to:
  - manage the messages transmitted by the switches;
  - aggregate data produced by the other services before transmitting this aggregated data to a level-2 management node service. This aggregation, for example a synthesis by correlation, enables the volume of communications received by the level-2 management node to be reduced. Such a correlation involves, for example, detecting that a certain number of connector malfunction messages for a given switch signifies the malfunction of the switch, and that it is therefore unnecessary to relay the connectors' malfunction messages;
- a network performance measurement service which obtains and records data concerning the performance of switches connected to the management node implementing the service.

A management node also implements a communication mechanism between the modules. Such a mechanism is asynchronous, such that management of the messages is not blocking for the various services.

Such an asynchronous mechanism is, for example, a subscription mechanism. A service subscribes to transmitted messages. When a message to which it is subscribed is published it will then read it.

Such a mechanism allows management of the switches to be optimised. For example, we can consider a scenario in which a connector of a switch malfunctions. In this case:
- the switch transmits a malfunction message to its management node, the one to which it is connected;
- the supervision service of the management node updates the topology database and activates the topology service of the management node receiving the message;
- the topology service publishes a message indicating the malfunction and starts a process intended to determine whether routing computation hypotheses are still valid; such a calculation generally lasts some ten seconds;

the routing service receives the message indicating the connector malfunction, and starts to calculate new routing tables, using common topology hypotheses. Such a calculation general lasts for more than some ten seconds;

the topology service detects a change in the topology hypotheses, and publishes this change;

the routing service receives the message indicating a change of topology hypotheses, interrupts the pending calculation and restarts a calculation on the basis of the new hypotheses.

The times given above are for topology sizes with more than 50000 compute nodes. With smaller topologies these times are therefore reduced accordingly.

In the above example it can be seen that, with the invention, the calculation of these routing tables can start directly when the malfunction is detected. If the hypotheses relating to the topology have not changed the routing calculation will be accomplished in a few seconds, as before the invention, in a comparable execution time. Conversely, if the calculation of the hypotheses, according to the invention, reveals that the initial hypothesis is no longer valid, the calculation of the routing is interrupted and restarted with an algorithm called an "agnostic routing algorithm", i.e. an algorithm which is insensitive to the topology. Before the invention the calculation is performed according to the initial hypothesis, and if that fails then, and only then, the topology-insensitive algorithm is started.

In addition, with the invention these calculations can be made simultaneously in several nodes, i.e. two malfunctions occurring in two switches of two different compute node groups can be managed simultaneously.

Another appropriate communication mechanism would be a letterbox mechanism, where each service has its own letterbox address, and all letterboxes are managed by the communication service.

In a variant of the invention a management node also executes a network performance measurement service. This is the network performance module. The network performance specifications are, for example:

transmission rate in each port;
number of packets;
lengths of queues;
number of errors;
protocols used;
etc.

This data is available in the switches and transmitted at regular intervals by the management nodes. This data is then aggregated by the management node and transmitted after aggregation, possibly with data produced by the other modules.

This enables the bandwidth used by the management node for transmission of performance data to be controlled.

The network performance module also stores the performance data, enabling the supercomputer's unprocessed performance data to be divided between the management nodes. A query can then be made from the level-2 management node, which will then search for the data in the management nodes according to the nature of the query. A form of storage is therefore obtained which is distributed over the management nodes, avoiding any use of a centralised storage device. This is of interest since, in order to be tolerant to malfunctions, such a centralised device must implement system redundancies. With the invention these redundancies are natural since they take the form of management nodes which are physically independent from one another. In addition, a centralised system must be able to have a large storage capacity for the data produced by all the supercomputer's switches. With the invention each management node has a storage capacity corresponding to the data produced by the switches which it manages.

With the invention a high and resilient storage capacity is obtained with lesser complexity than an equivalent centralised capacity.

With the invention all the functions of a conventional "fabric manager" can be found, but they are distributed and executed in such a way that they can be implemented even in the context of a supercomputer with over 1000 switches.

The invention enables known supercomputer design processes to be continue to be used, in particular in terms of the positioning of wiring topology, but with a management mode which is much more responsive and appropriate for increasingly large topologies.

Implementation of the method therefore enables an operational and manageable supercomputer to be obtained.

The invention claimed is:

1. A method for managing a network of compute nodes interconnected by a plurality of interconnection devices, the method comprising:

organizing compute nodes into groups of compute nodes;

for each group of compute nodes, connecting interconnection devices interconnecting the compute nodes of the group to a group management node, wherein the group management node is dedicated to the group of compute nodes, in each group management node, executing a management function through an implementation of independent management modules, wherein each management module for managing a management node is configured to communicate with other management modules of the same management node, wherein the communication between the management modules of the same management node is asynchronous, and wherein at least one group management node is connected to a level-2 management node, and determining, by the at least one group management node, whether to transmit one or more messages to the level-2 management node based on processing of the one or more messages by the at least one group management node.

2. The method according to claim 1, wherein the group management node is connected in an out-of-band mode to the interconnection devices.

3. The method according to claim 1, wherein the management modules include:

a network topology management module,
a routing management module,
a network supervision module, and
a network performance measurement module.

4. The method according to claim 1, wherein communications between the at least one group management node and the level-2 management node are accomplished in an out-of-band mode.

5. The method according to claim 1, wherein a management node module processes the one or more messages received from at least one interconnection device to reduce quantity of data transmitted to the level-2 management node.

6. The method according to claim 3, wherein the network topology management module is configured to maintain up-to-date a topology database and a status of each connector of each interconnection device.

7. The method according to claim 3, wherein the routing management module is configured to calculate routing tables.

8. The method according to claim 3, wherein the network supervision module is configured to manage messages transmitted by the interconnection devices and aggregate data produced by other management modules.

9. The method according to claim 8, wherein the data is aggregated before transmitting the aggregated data to a level-2 management node.

10. The method according to claim 3, wherein the network performance measurement module is configured to obtain and record data concerning a performance of the interconnection devices.

11. The method according to claim 10, wherein the data concerning the performance of the interconnection devices includes a transmission rate in each port, number of packets, length of queues, number of errors, and protocols used.

12. The method of claim 1, wherein the level-2 management node is connected to the at least one group management node via a switch.

13. The method of claim 1, wherein the processing of the one or more messages includes determining a number of the one or more messages, the method further comprising:
    determining, by the at least one group management node, not to transmit the one or more messages to the level-2 management node when the number of the one or more messages exceeds a predetermined threshold.

14. The method of claim 13, wherein the one or more messages are received by the at least one group management node from one or more of the interconnection devices.

15. The method of claim 14, wherein the level-2 management node is dedicated to a group of a plurality of group management nodes.

16. A non-transitory machine readable storage medium storing computer program instructions that, when executed, by a computer cause the computer to perform operations comprising:
    executing, for a management node, a management function through an implementation of independent management modules;
    communicating, by a management module of the management node, with other management modules of the same management node,
    wherein the communication between the management module and the other management modules of the same management node is asynchronous,
    wherein the management node is connected to a group of compute nodes via interconnection devices, and
    wherein the management node is connected to a level-2 management node; and
    determining by the management node, whether to transmit one or more messages to the level-2 management node based on processing of the one or more messages by the management node.

17. A system comprising:
    a group of compute nodes;
    interconnection devices connecting the group of compute nodes to a management node, wherein the management node is dedicated to the group of computer nodes; and
    the management node, wherein the management node is configured to execute a management function through an implementation of independent management modules, wherein a management module for managing the management node is configured to communicate with other management modules of the same management node, wherein the communication between the management modules of the same management node is asynchronous, wherein the management node is connected to a level-2 management node, and wherein the management node determines whether to transmit one or more message to the level-2 management node based on processing of the one or more messages by the management node.

* * * * *